United States Patent Office 3,230,978
Patented Jan. 25, 1966

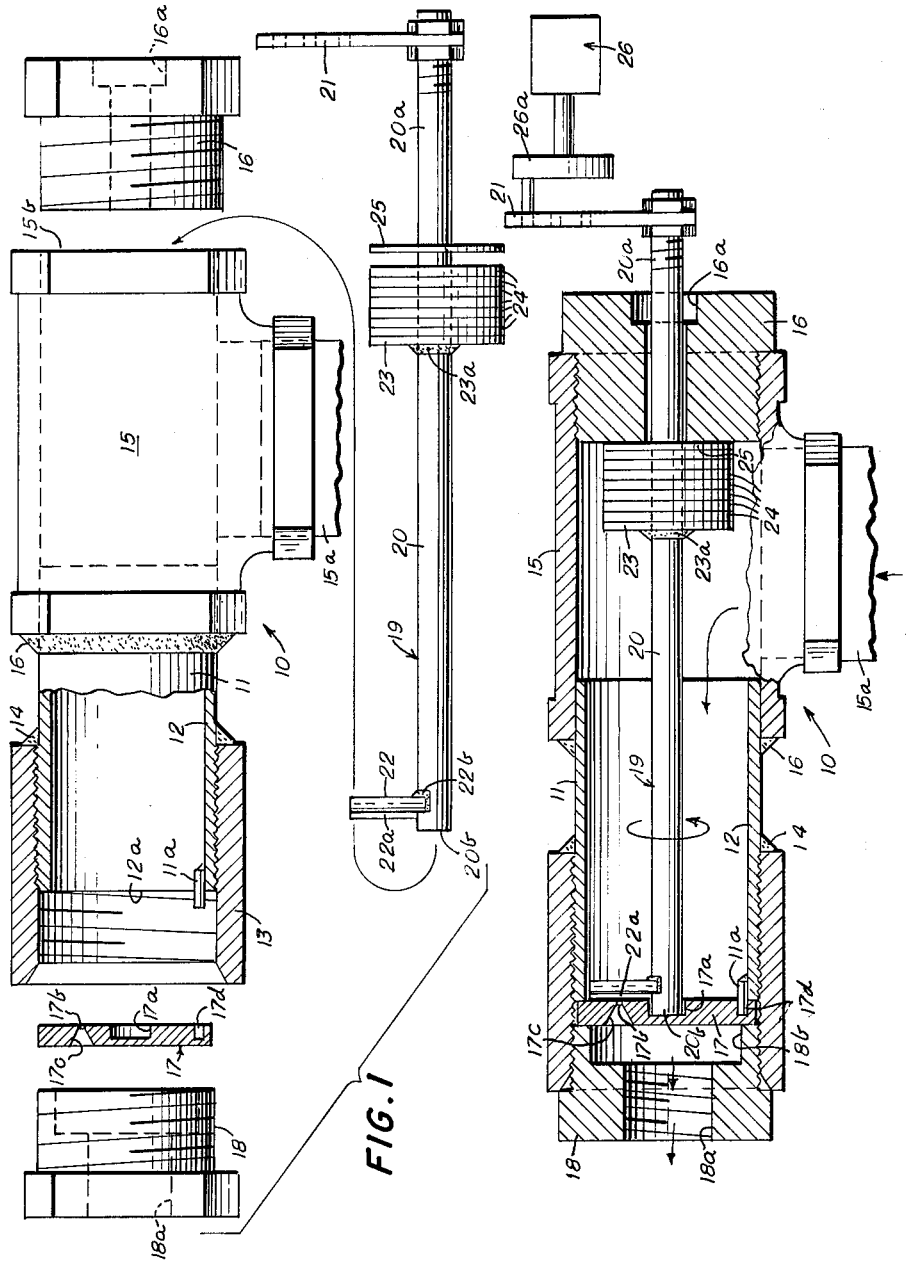

3,230,978
ORIFICE CLEANING DEVICE WITH OPERATING ROD HAVING PARTICULAR BIASING AND SEALING MEANS
Jennings B. Keaton, Jr., 4217 Dakota St., Odessa, Tex.
Filed Apr. 15, 1963, Ser. No. 272,987
2 Claims. (Cl. 138—40)

This invention is directed to apparatus for feeding of fluids through an orifice having a mechanical cleaner for keeping the orifice open.

In the transfer of fluids and particularly liquids carrying or having entrained particles that may be detrimental to valve actuation and the like in a fluid handling system there is the problem of providing continuous free flow and unobstructed operation of such valves and the like in such systems.

It is an object of the invention to provide an orifice in a fluid handling system with a mechanical cleaner to maintain free flow through the orifice in the system.

Another object of the invention is to provide a fluid handling conduit system having a coupling thereof fitted with a removable orifice plate and a cooperating mechanical wiper for cleaning the aperture extending through the orifice plate from within the system with the mechanical wiper being operable to a position external of the system during flow or nonflow of fluid in the system and through the orifice.

A further object of the invention is to provide a trouble free orifice cleaning apparatus in a fluid system that is economical to construct, maintain and operate.

For a more complete understanding of the nature and scope of the invention reference is had to the drawing, the specification and claims which follow.

In the drawing:

FIG. 1 is an exploded view of the apparatus with some parts in vertical cross section;

FIG. 2 is an assembled view of the apparatus with some of the parts in vertical cross section; and FIG. 3 is a plan view of the orifice plate viewed in the direction of flow of the fluid therethrough.

Throughout the description like reference numbers refer to similar parts.

The orifice cleaning device for fluid feeding according to the invention is generally indicated at 10 and comprises an elongated housing 11 which in the particular illustration is made up of a length of tubular pipe 12 threaded at each end and receiving at cone end, termed an outlet end, an internally threaded pipe coupling 13 which when in position is tack welded as at 14 so that its outlet end 13a is in spaced relation beyond the end 12a of the tubular pipe 12. The rest of the housing includes a T-shaped pipe coupling 15 threadedly received on the other threaded end of member 12 in an axial manner and secured as by tack welding 16. The T-shaped pipe fiitting has an inlet portion designated 15a while the other axial end 15b threadedly received therein a centrally apertured plug 16 for mounting a wiper rod 20 as will be explained.

An orifice plate 17 has a central recess 17a in the face thereof, a fluid orifice 17b extending therethrough and having a cone-shaped exit portion 17c extending with the widening portion of the cone in the direction of flow of fluid through the orifice. Orifice plate 17 also has an aligning recess 17d extending therein which is recessed by a locating pin 11a welded to and extending from the end of member 11. The orifice plate 17 is received within the open or outlet end of coupling 13 and is held therein by an apertured bushing 18 threadedly received in the internal threaded outlet end of member 13. The bushing 18 is internally threaded at 18a to receive a further pipe coupling to couple it into a fluid system. It also has a suitable stepped aperture portion 18b on its inlet end so as to provide for free flow fluid from the orifice 17b through the bushing.

In the flow of fluid through the device obstructions sometimes clog the orifice aperture 17b and to prevent its clogging and to keep it always clear and free flowing there is provided a wiper generally indicated at 19 which is made up of a wiper rod 20 that is received in the apertured plug 16 so that the other end 20a of the rod 20 extends exteriorly of the housing and also the plug 16 where it has attached an operating arm 21. The internal end 20b of the rod 20 is received within the recess 17a in the orifice plate 17 and has mounted in spaced relation there adjacent that end 20b a wiper blade 22 having a knife edge portion at 22a for wiping action over the orifice 17b. The wiper blade 22 is made of oil and water resistant material. The wiper blade 22 as shown is welded as at 22b to the adjacent end portion of the rod 20.

In order to provide a fluid tight seal for sealing the operating rod 20 as it extends through the apertured plug 16, there is provided a metal washer 23 welded to the rod 20 at a position towards the end 20a as at 23a and a plurality of composition washers 24 of oil and water resistant material slipped over rod 20. A metal washer 25 is received over the rod 20 adjacent the packing washers 24 and it rides up in an abutting fit against the inner face of the apertured plug 16. Thus the composition washers 24 and the washer 25 provide a seal for preventing fluid flow through the aperture 16a in plug 16 and also a resiliency or spring action to urge the rod toward the left as the plug 16 is screwed into the coupling 15. Thus, the wiper blade 22 carried by rod 20 is constantly in tight engagement with the orifice blade 17 but still permitted wiping action thereagainst.

Operating means such as the power mechanism operating the sucker rod of an oil well where this device is used in conjunction with producing apparatus provides by power take off rotary motion to the operating arm 21 for the rod 20 and thereby the rod is oscillated back and forth in a rotary fashion so that the blade 22 and its knife edge portion 22a wipes against the orifice plate and cleans the orifice 17b extending therethrough. Such power mechanism as runs the sucker rod of a pump is generally indicated at 26 with suitable power take off or power drive coupling as it 26a to operate the arm 21.

The orifice cleaning apparatus is of simple but relatively rugged construction which requires little upkeep or adjustment, yet is highly efficient in keeping clean operating parts such as valve seats and the like in a fluid handling system.

I claim as my invention:

1. Fluid feeding apparatus comprising in combination, a housing for fluid flow therethrough and having a fluid inlet and a fluid outlet, an orifice plate removably mounted in said housing adjacent said fluid outlet portion and having an orifice extending therethrough from inside face to outside thereof and bearing means on the inside face, a bushing having a fluid flow aperture therethrough and removably mounted in said outlet portion of said housing and holding said orifice plate in position in said housing, and a wiper means for said orifice in the orifice plate for movement past said orifice, said wiper including an actuating rod having its inner end rotatably mounted in said bearing means in the inner face of said orifice plate, means mounting the other end of said rod for rotation in said housing, sealing and spring means in said housing through which said rod extends to the interior of said housing, said sealing and spring means comprising an apertured plug removably received in said housing and through which said rod extends and spring packing means within the housing about said rod and adjacent the end of said plug within the housing, said wiper rod having a wiper blade thereon for movement over said orifice in the orifice plate, said spring packing means urging said wiper rod and blade lengthwise of the rod so that the wiper blade is biased into engagement with the orifice plate, said sealing and spring means extending in axial alignment with said outlet opening in said housing and on an opposite portion thereof and wherein said inlet means is on said housing intermediate the outlet portion and said apertured plug of the sealing and spring means and said rod has a transversely extending washer element through which the rod extends and is attached thereto intermediate the ends of the rod, said spring packing means consisting of a plurality of resilient composition washer elements received over said rod and closely packed intermediate said washer attached to the rod and said apertured plug.

2. Fluid feeding apparatus according to claim 1 including an operating lever attached in the exterior end portion of said rod for rotating said rod.

References Cited by the Examiner

UNITED STATES PATENTS

| | | | |
|---|---|---|---|
| 865,270 | 9/1907 | Rietzke | 137—242 XR |
| 910,178 | 1/1909 | Cosmovici | 158—120 |
| 940,163 | 11/1909 | Kiel | 251—214 X |
| 1,105,209 | 7/1914 | Sauchereau | 137—242 |
| 1,471,991 | 10/1923 | White | 137—243.2 |
| 2,773,720 | 12/1956 | Palm et al. | 137—244 XR |
| 2,953,154 | 9/1960 | Agoliati et al. | 251—214 X |
| 2,967,555 | 1/1961 | Baker | 146—189 |

FOREIGN PATENTS

| | | |
|---|---|---|
| 575,780 | 4/1958 | Italy. |

MARTIN P. SCHWADRON, *Acting Primary Examiner.*

ISADOR WEIL, *Examiner.*